S. P. HUNTINGTON.
REGISTERING FARE BOX.
APPLICATION FILED FEB. 7, 1912.
1,180,499.
Patented Apr. 25, 1916.
15 SHEETS—SHEET 1.
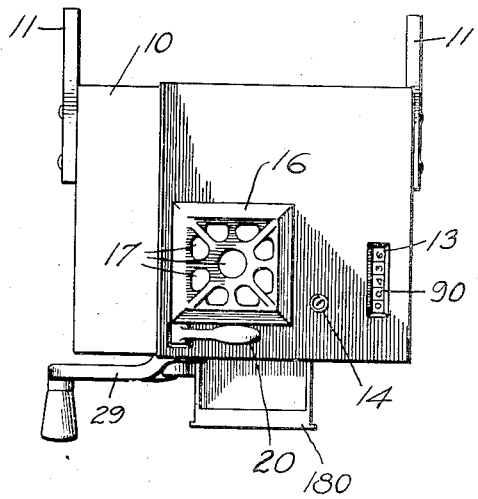
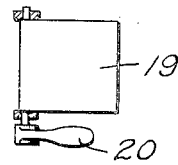
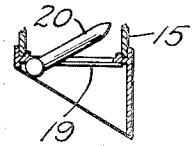
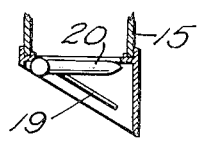
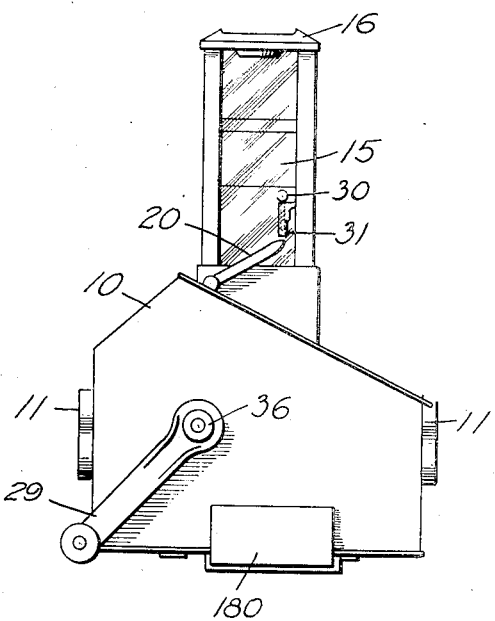
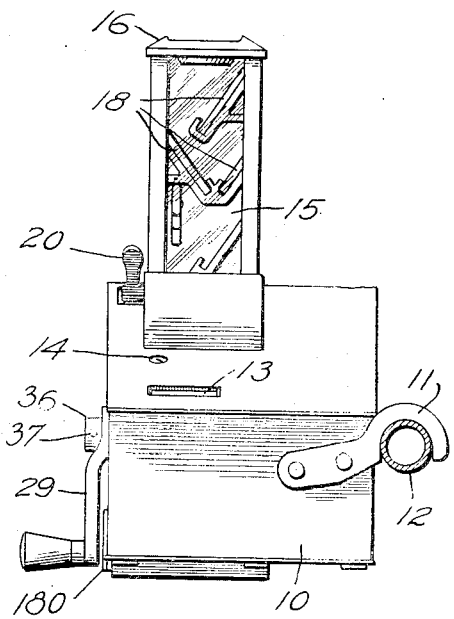
Witnesses:
J. S. Grotta
W. H. Linton
Inventor:
Samuel P. Huntington
by W. H. Honiss
Atty.

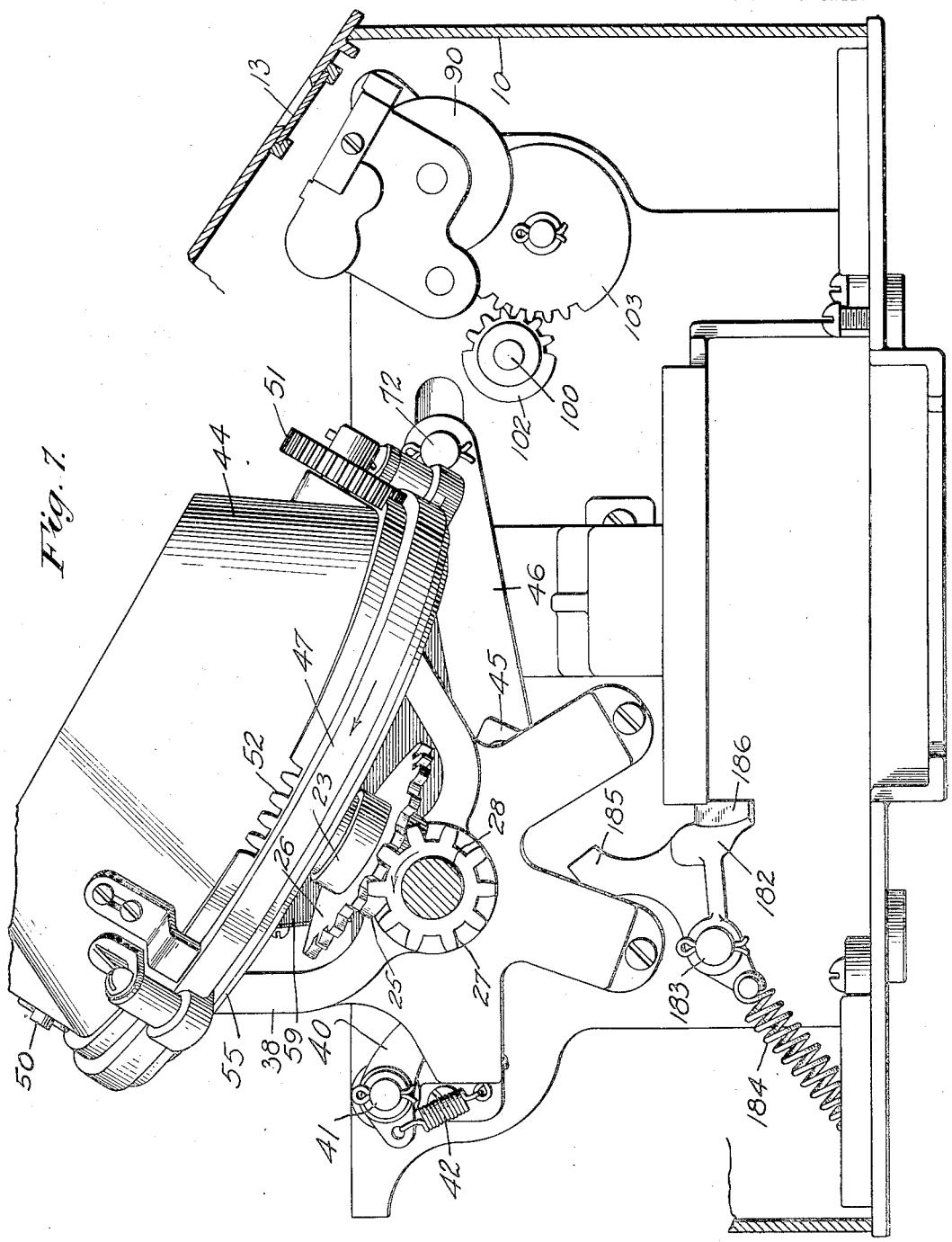

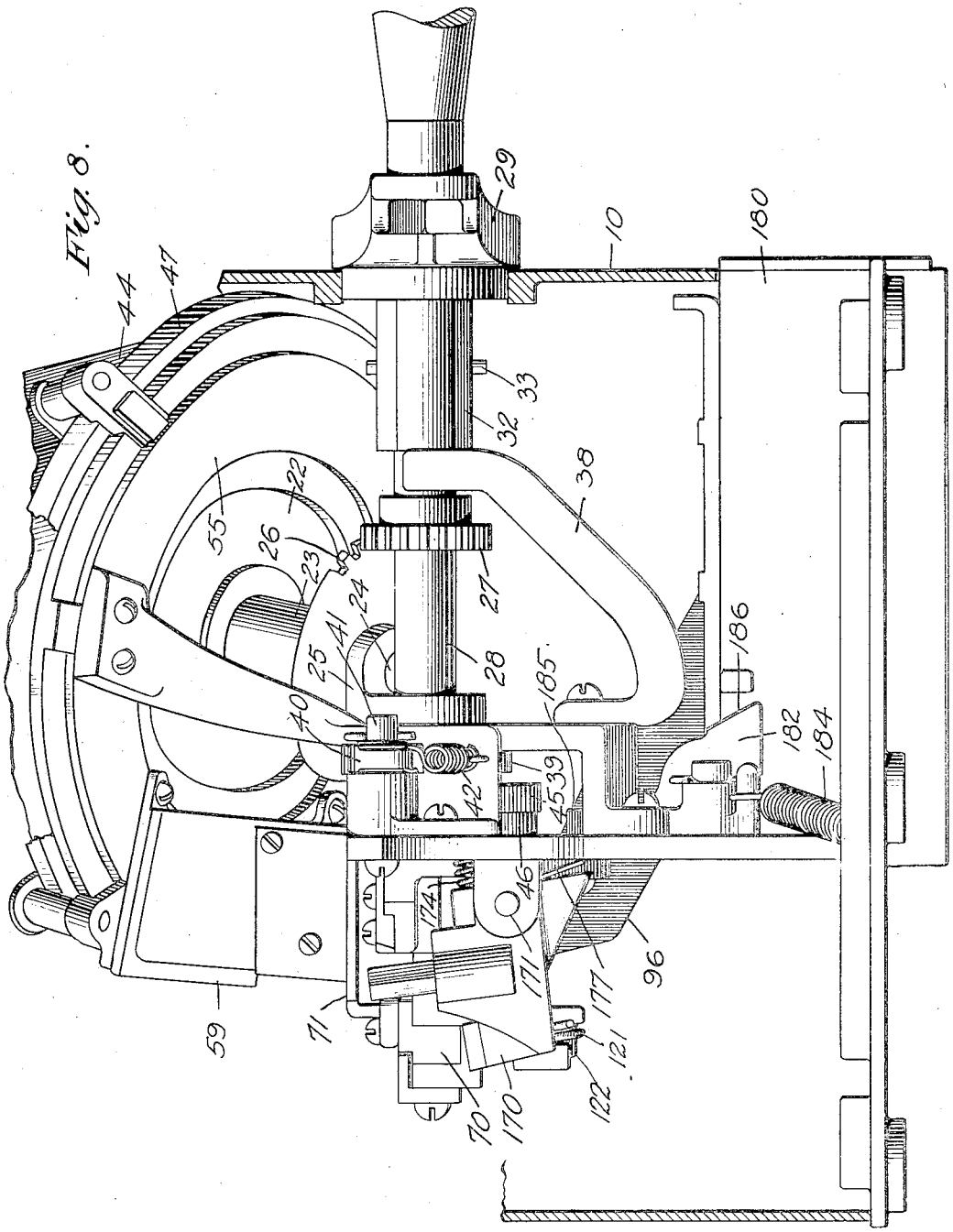

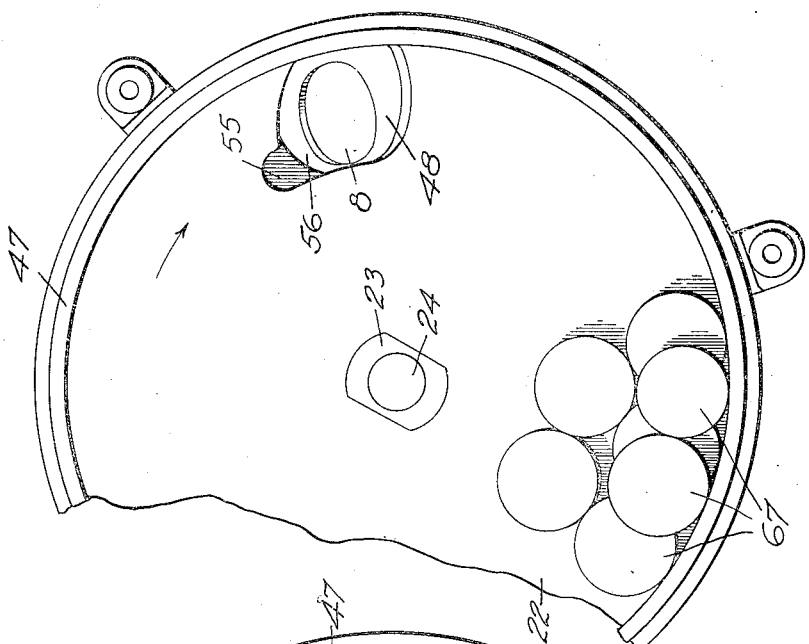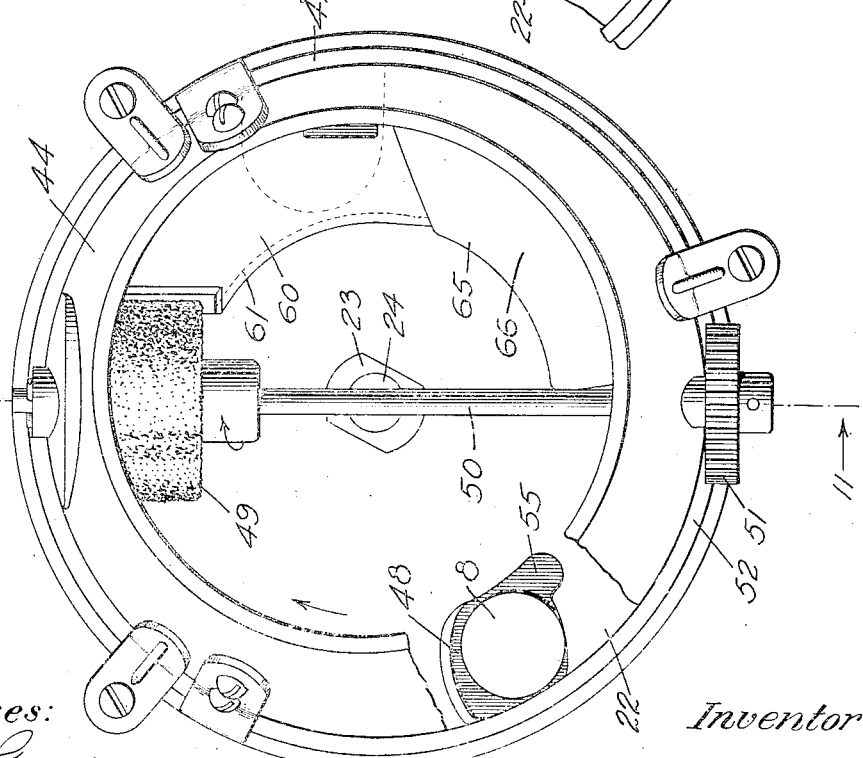

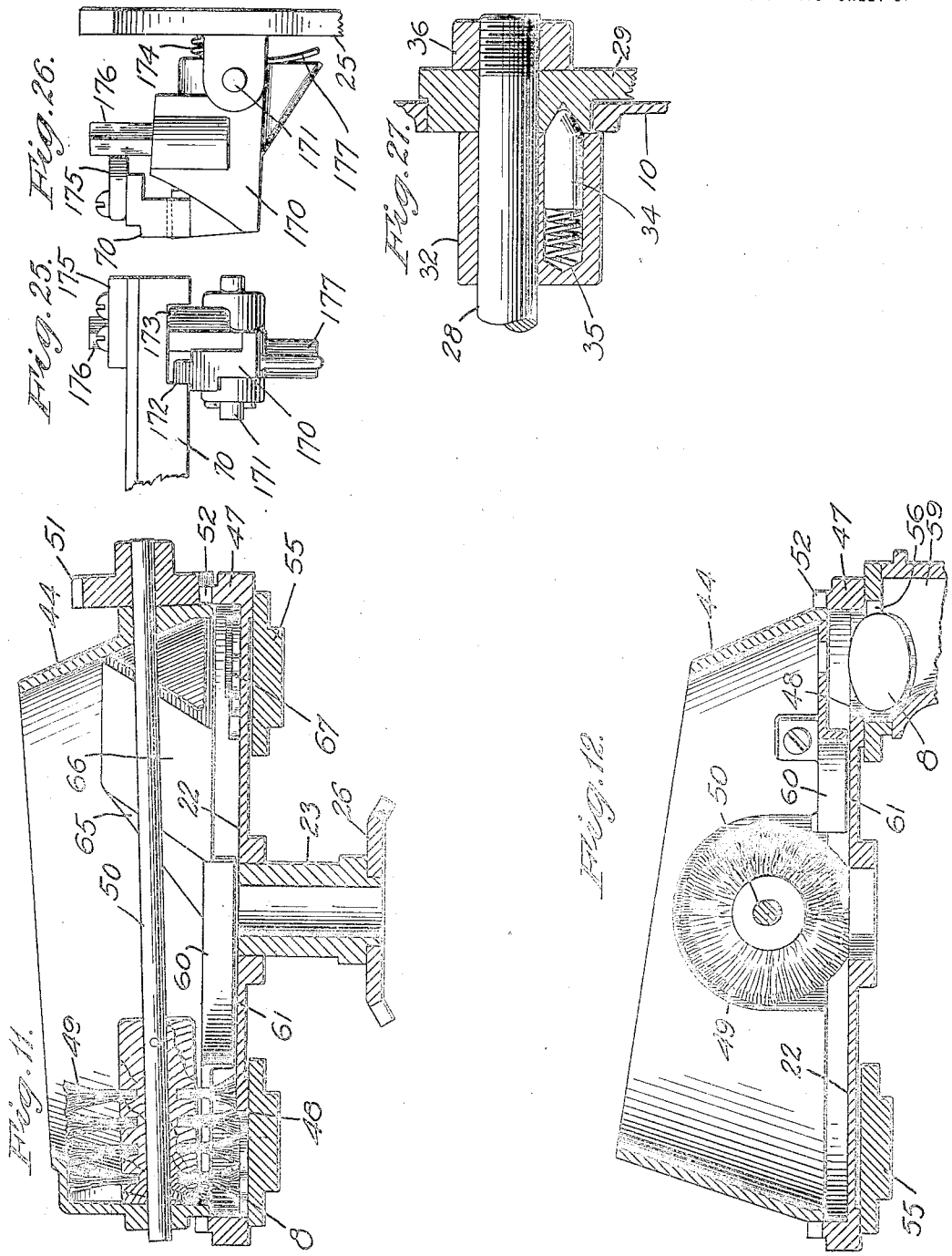

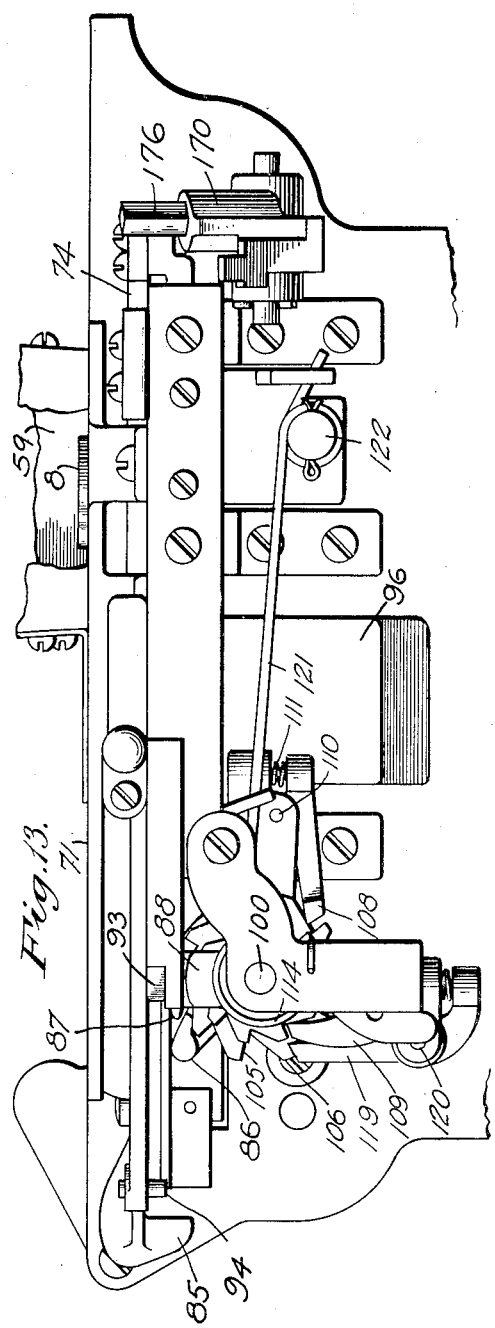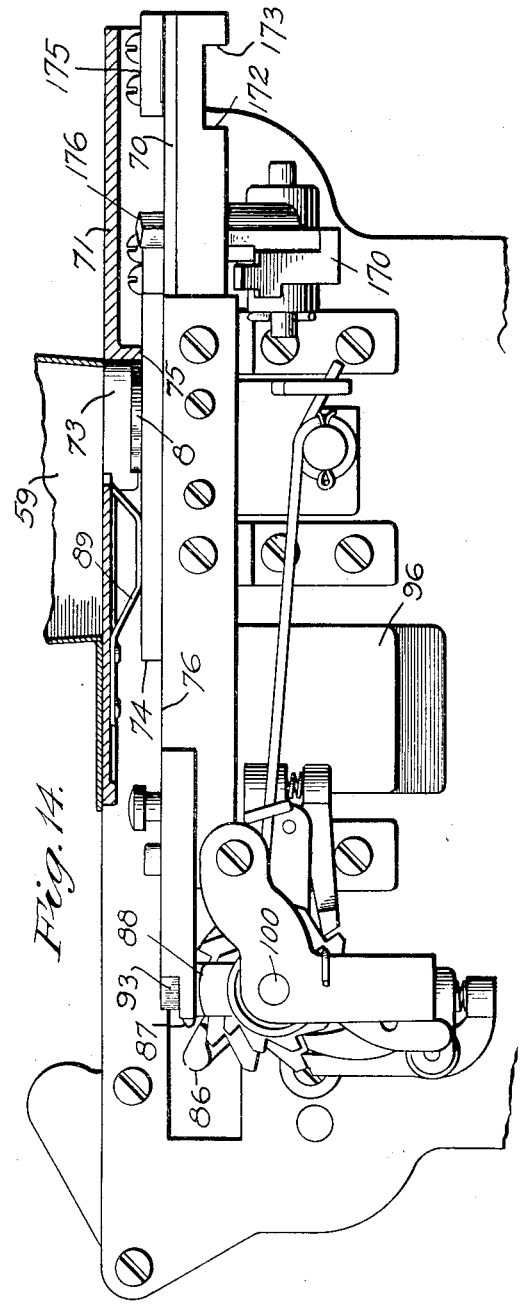

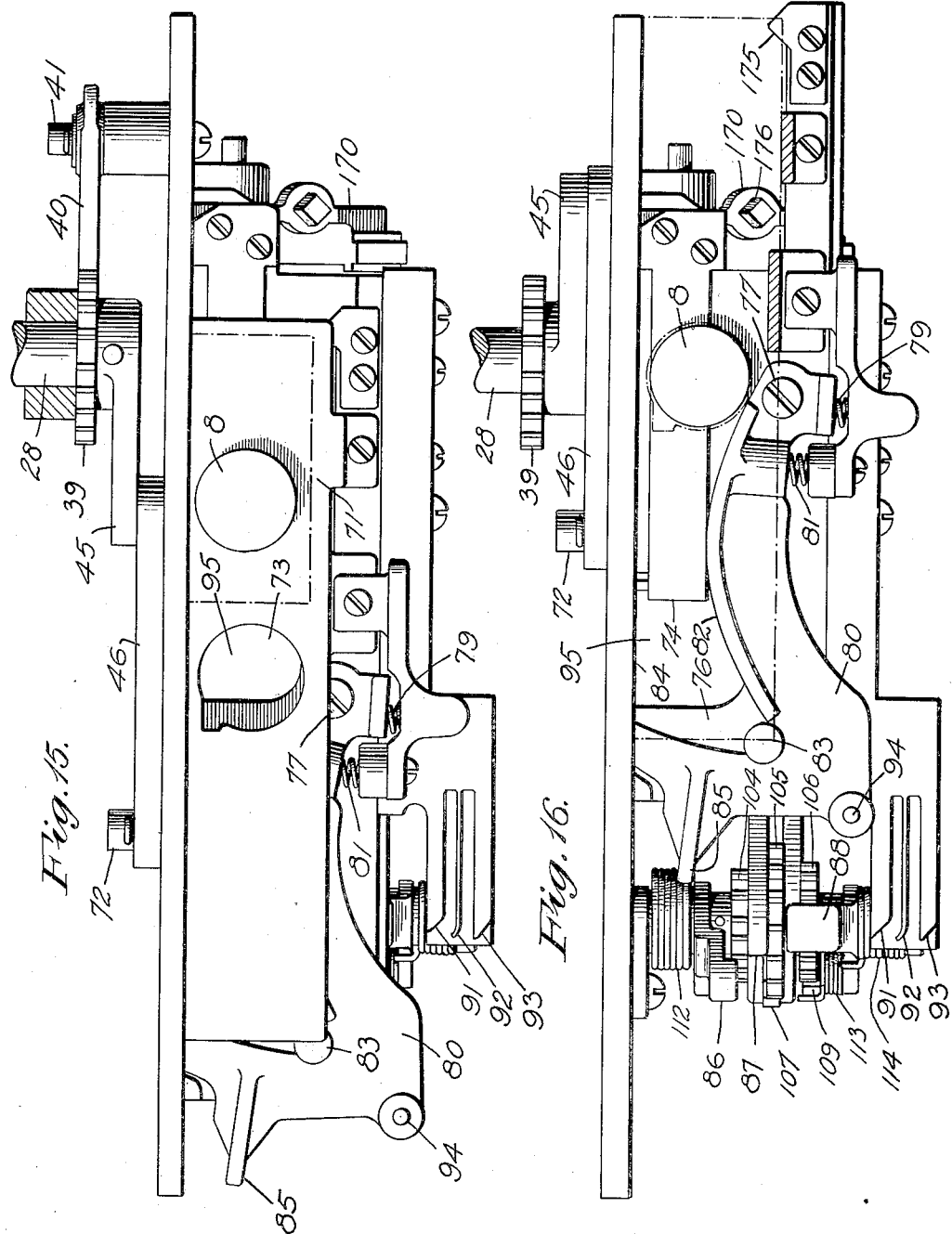

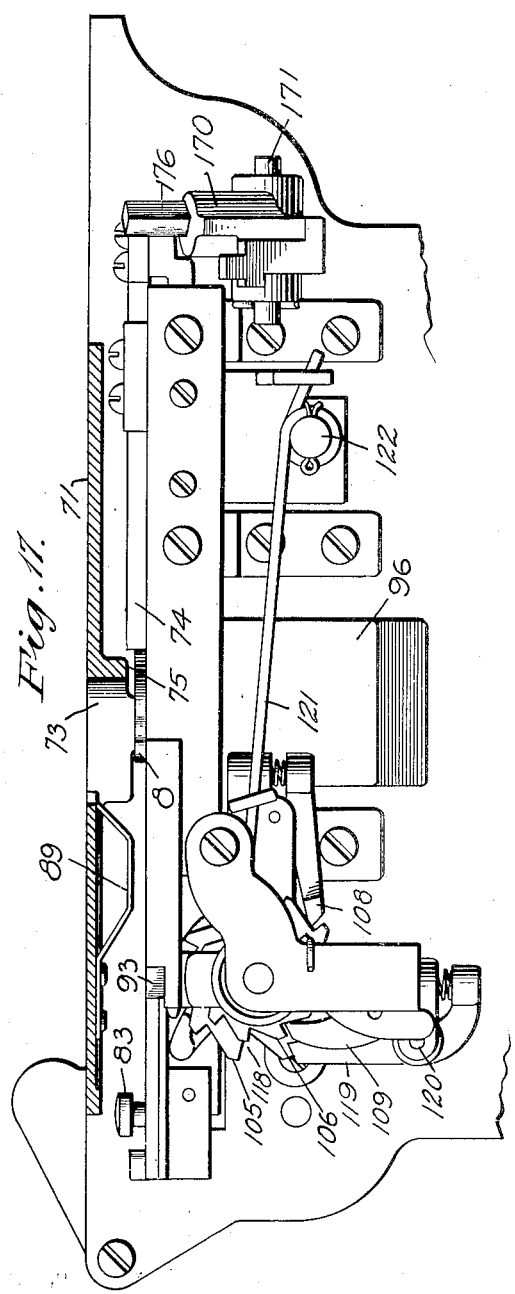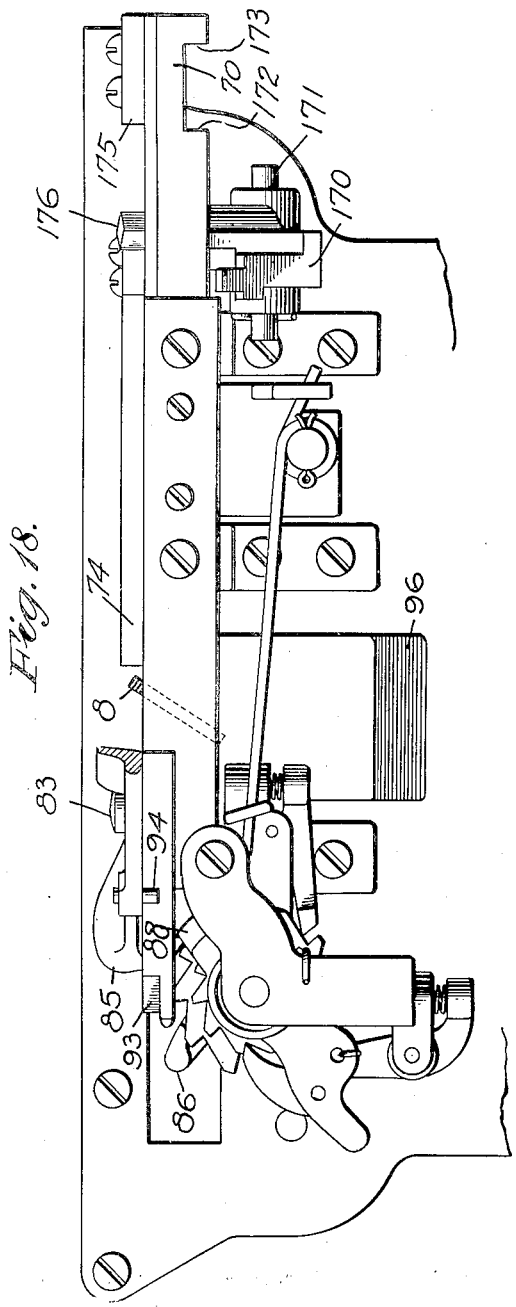

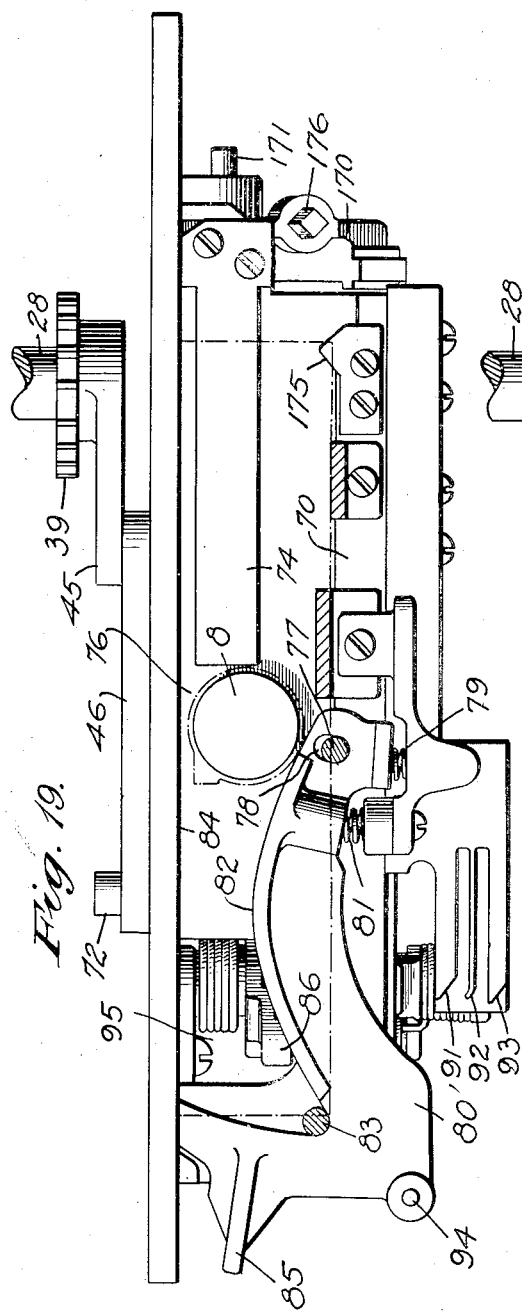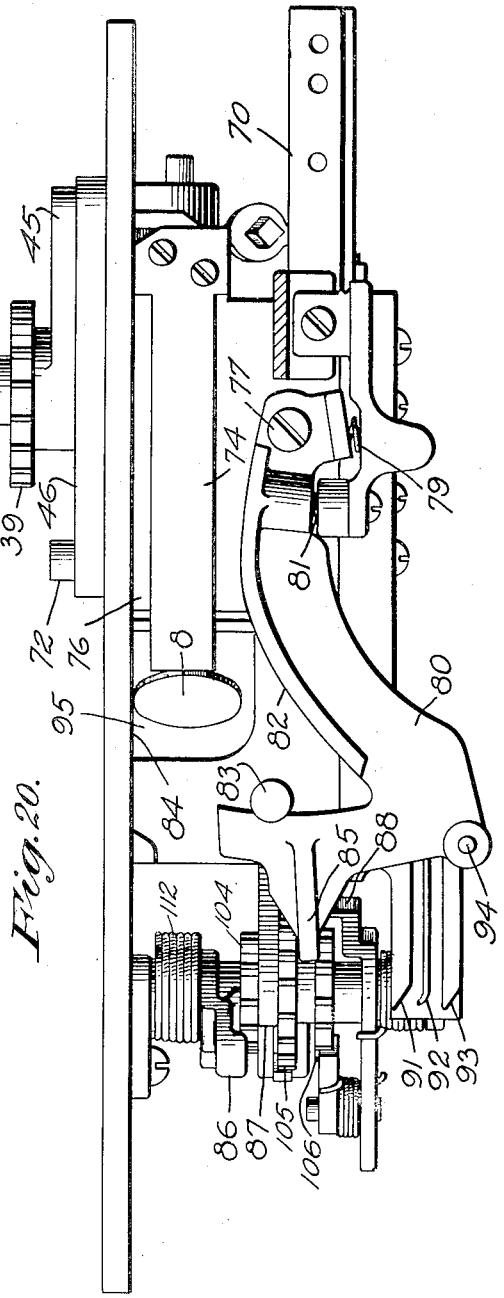

S. P. HUNTINGTON.
REGISTERING FARE BOX.
APPLICATION FILED FEB. 7, 1912.
1,180,499.
Patented Apr. 25, 1916.
15 SHEETS—SHEET 10.
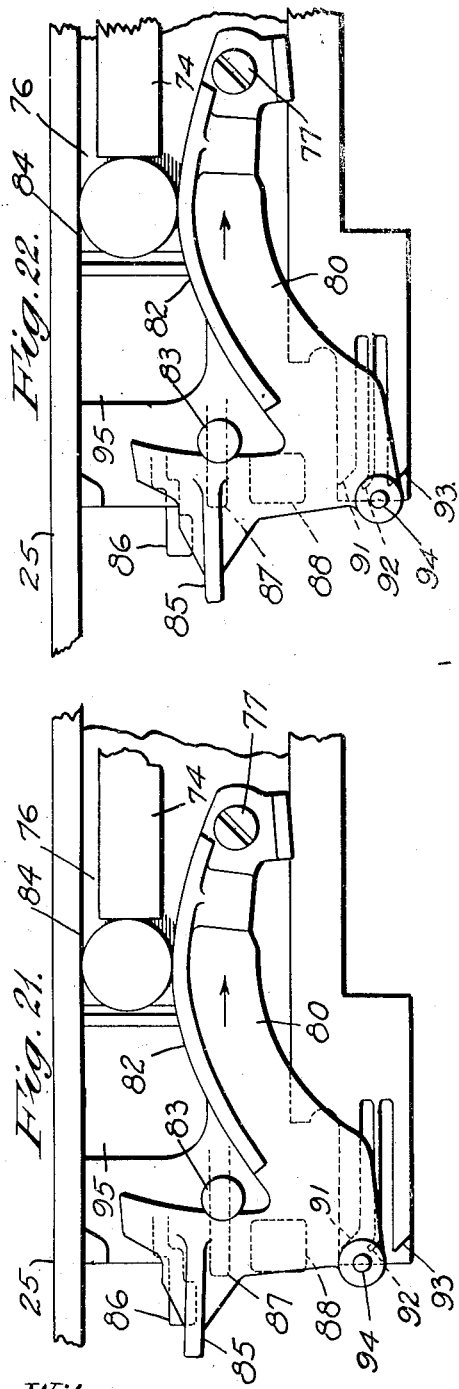
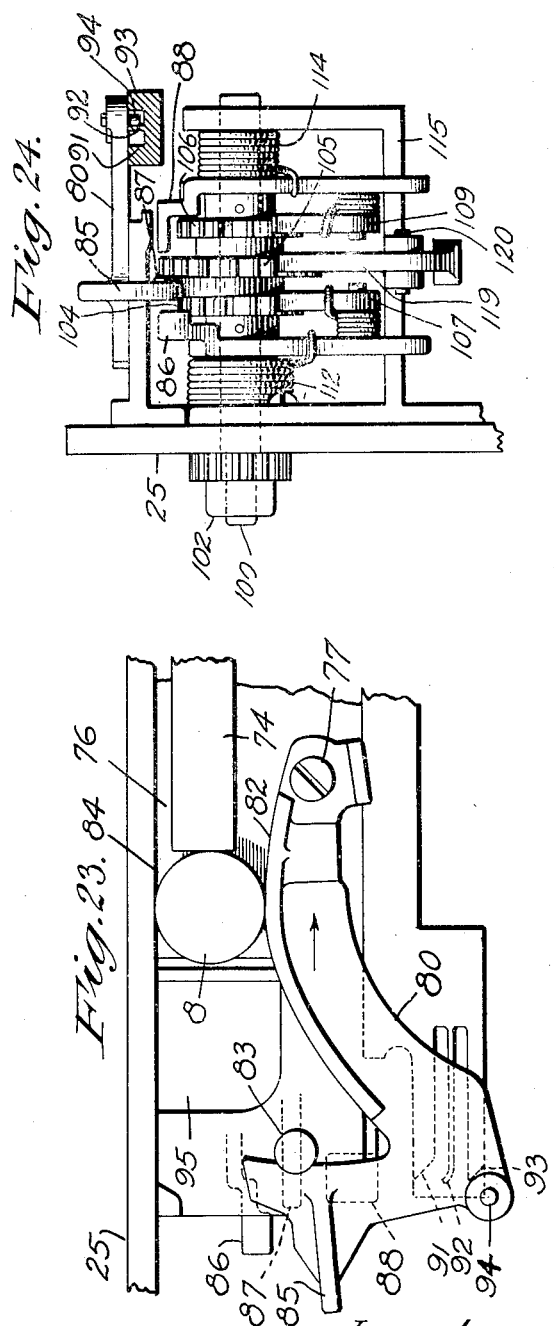
Witnesses:
S. S. Grotta
W. H. Linton
Inventor:
Samuel P. Huntington
by W. H. Howiss
Atty.

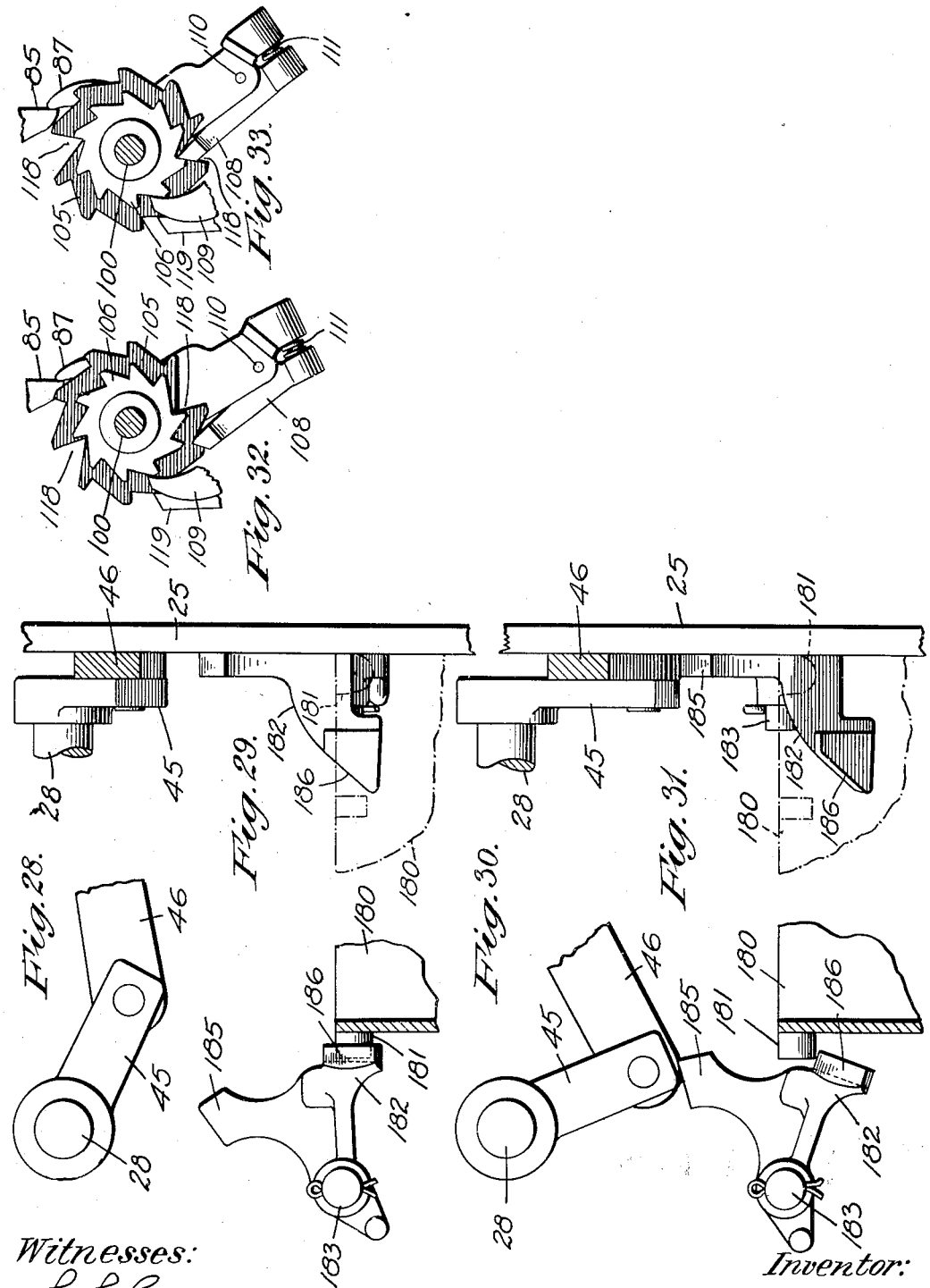

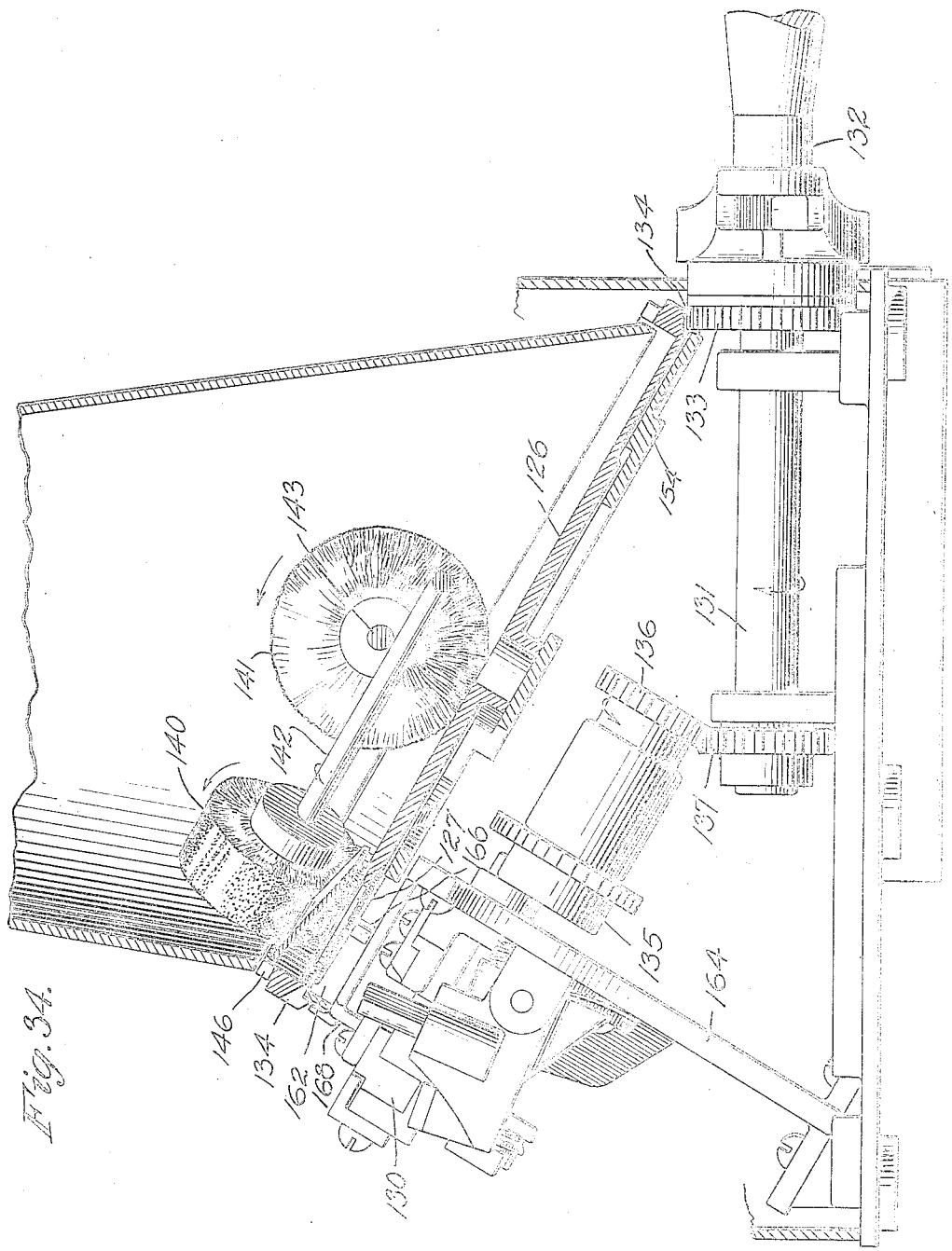

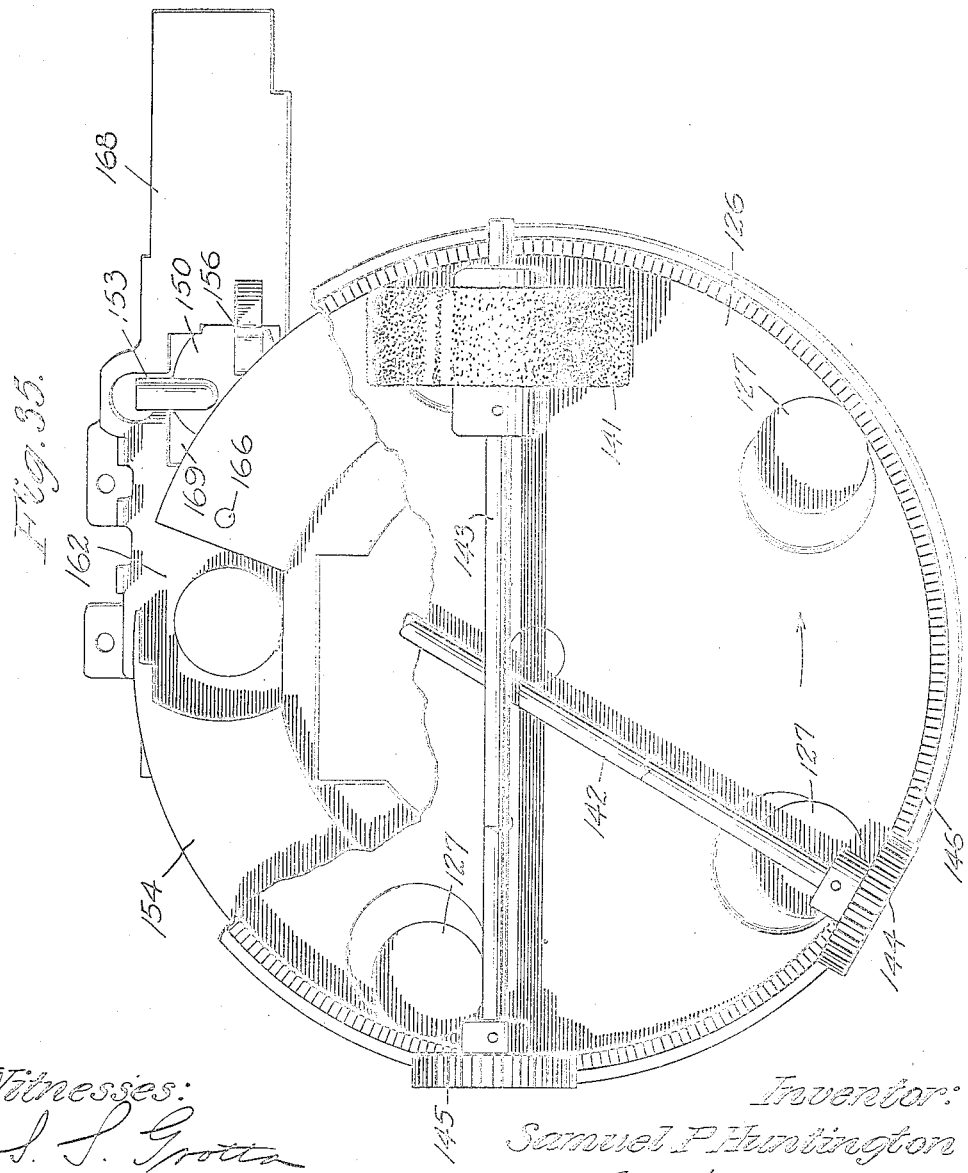

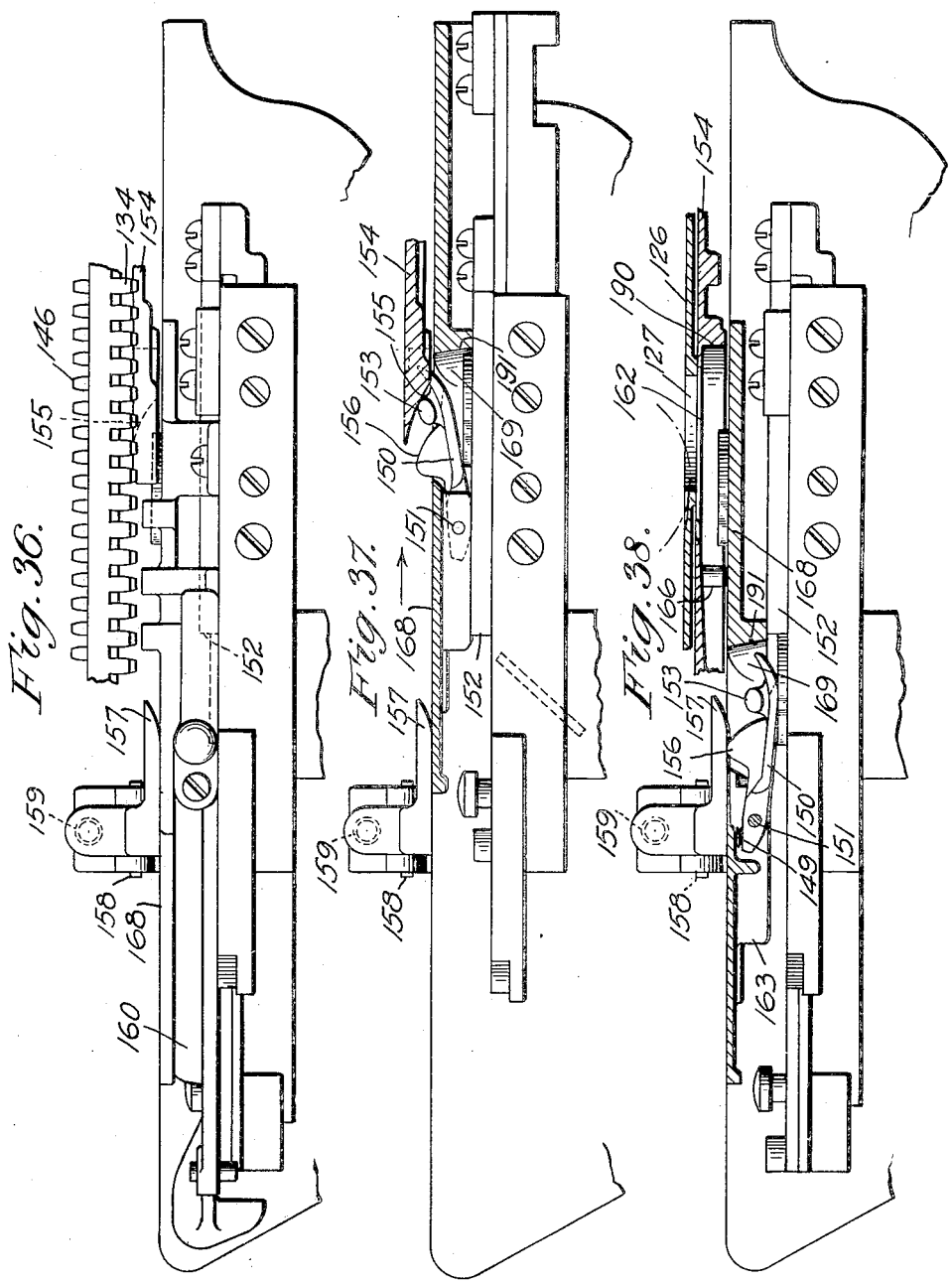

S. P. HUNTINGTON.
REGISTERING FARE BOX.
APPLICATION FILED FEB. 7, 1912.
1,180,499.
Patented Apr. 25, 1916.
15 SHEETS—SHEET 15.
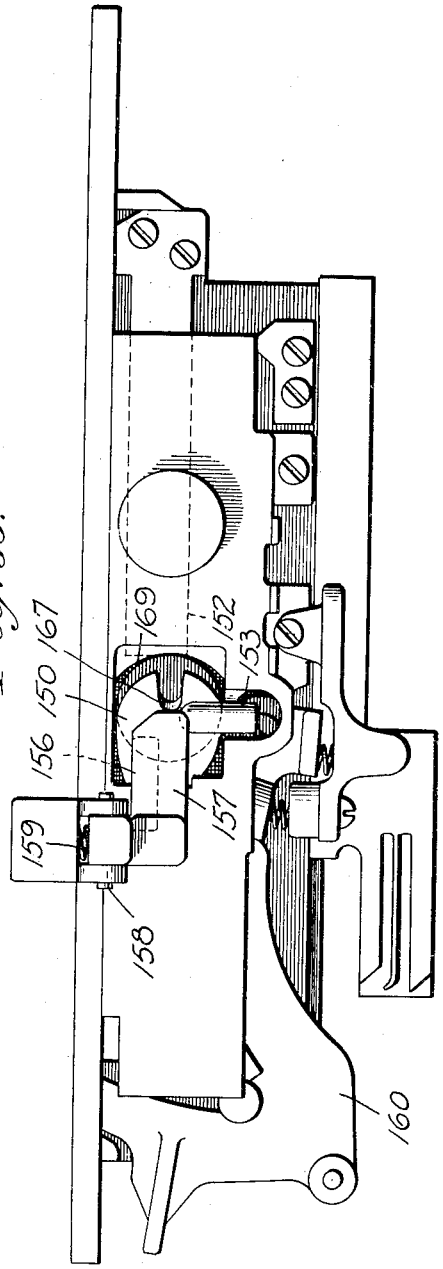
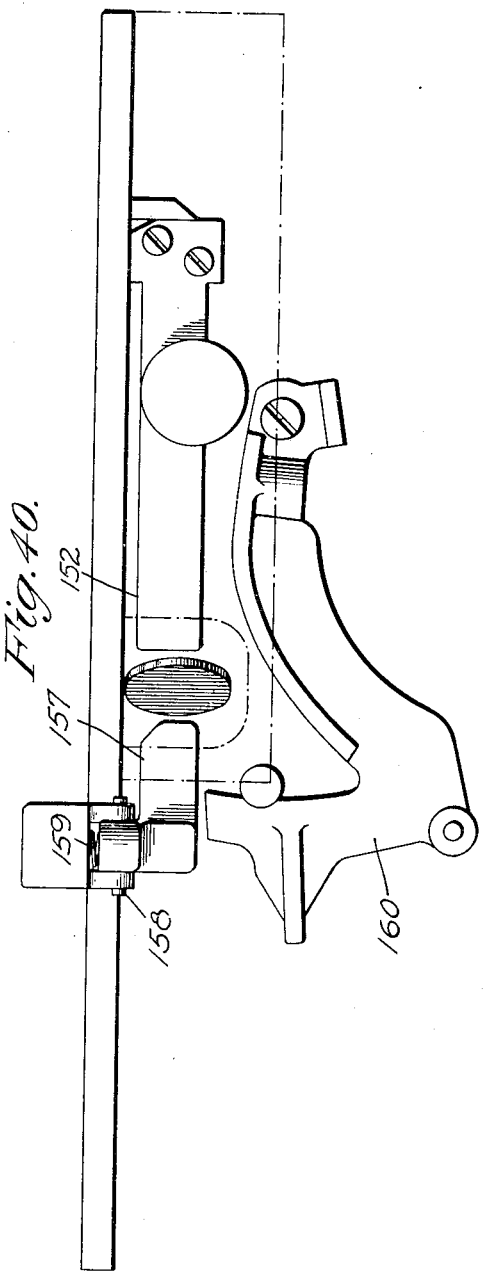
Witnesses:
Inventor:
Samuel P. Huntington

UNITED STATES PATENT OFFICE.

SAMUEL P. HUNTINGTON, OF NEW HAVEN, CONNECTICUT, ASSIGNOR TO THE RECORDING REGISTER AND FARE BOX COMPANY, OF NEW HAVEN, CONNECTICUT, A CORPORATION OF CONNECTICUT.

REGISTERING FARE-BOX.

1,180,499. Specification of Letters Patent. Patented Apr. 25, 1916.

Application filed February 7, 1912. Serial No. 675,967.

*To all whom it may concern:*

Be it known that I, SAMUEL P. HUNTINGTON, a citizen of the United States, residing at New Haven, in the county of New Haven and State of Connecticut, have invented new and useful Improvements in Registering Fare-Boxes, of which the following is a specification.

This invention relates to improvements in mechanism for receiving and registering fares paid at turnstiles or on street cars, ferries and similar utilities.

The embodiment of the invention herein shown is an organized machine adapted for receiving coins of certain denominations, and rejecting others, displaying the received coins for inspection by the conductor, but out of his reach. Through the inspection chamber the coins pass to a hopper or receptacle, which will hold such an accumulation of coins as is likely to occur within a short time at central stopping places, or at rush periods of traffic. From this accumulating receptacle, the coins are withdrawn one at a time, and pass through a registering apparatus which registers them according to their denomination, either in terms of dollars and cents or according to the number of fare units they represent. Having been thus registered, the coins fall into a drawer and may be made accessible to the conductor or attendant in order that he may use them for making change.

Figure 1 of the accompanying drawings is a plan view, Fig. 2 a side elevation, and Fig. 3 a front elevation, showing the exterior of my improved machine. Fig. 4 is a plan view, and Figs. 5 and 6 are sectional end elevations, showing the detailed construction and mode of operation of the trap door between the inspecting and the registering sections of the machine. Fig. 7 is a side elevation in larger scale, of the driving drawer releasing mechanism of the machine. Fig. 8 is a rearward elevation projected from Fig. 7, looking toward the right in the latter figure. Figs. 9 and 10 are plan views of the hopper and coin separating mechanism. Fig. 11 is a side view in section taken through the line 11—11 of Fig. 9, showing the operation of isolating a coin for withdrawal, and wiping or sweeping back the remaining coins. Fig. 12 is a rearward elevation projected from Fig. 11, and looking toward the right in that figure, illustrating the ejection of the coin from the coin plate, after isolation. Figs. 13, 14, 17 and 18 are side elevations viewed from the side opposite to that shown in Fig. 7, of the coin measuring and registering mechanism, showing the coin at different stages of its progress. Figs. 15, 16, 19, 20, 21, 22 and 23 are plan views of the coin measuring and registering mechanism, illustrating the different stages of operations, and in the three latter views on coins of different denominations. Fig. 24 is a front end elevation, looking toward the right in Figs. 13 to 23, inclusive, showing the ratchet wheels for advancing the registering dials, and illustrating their selection by the measuring or selecting arm, according to the denomination of the coin. Fig. 25 is an end view, and Fig. 26 a front view of a regulating device for preventing excessive speed in the operation of the machine. Fig. 27 is a side view in section showing a safety slip device between the exterior crank and the interior mechanism. Figs. 28 to 31, inclusive, are side and end views illustrating the arrangement and operation of the devices for periodically locking and unlocking the coin drawer. Fig. 28 is a side view and Fig. 29 an end view, showing the drawer locked. Fig. 30 is a side view and Fig. 31 an end view showing the drawer unlocked by the traveling movement of a crank associated with the registering mechanism. Figs. 32 and 33 are side views showing the ratchets employed for registering pennies and five cent pieces, Fig. 32 illustrating the position of the ratchets when four pennies have been deposited, while Fig. 33 illustrates the advancement of the ratchets in the registration of the fifth penny. Figs. 34 to 40 inclusive illustrate an embodiment of the invention in which some of the features are modified from the foregoing description. Fig. 34 is a side elevation partly in section, the external casing of the mechanism being removed. Fig. 35 is a plan view projected from Fig. 34 at a right angle with the coin plate. Figs. 36, 37 and 38 are side elevations, illustrating different positions of the carriage mechanism. Figs. 39 and 40 are plan views projected from Figs. 36 and 37 respectively.

The general exterior appearance of these fare boxes is best shown in Figs. 1 to 3, although it will be understood that the exterior form as well as the interior arrangement may be modified in various ways. As herein illustrated, the exterior case is of a form and arrangement suitable for protecting the interior mechanism against the elements, so that it may be used out of doors, and against mischievous or malicious tampering. The body portion 10 of the case is provided with arms or hooks 11, which as shown in Fig. 3 may be hooked over a railing 12 of a car, or the casing may otherwise be adapted for attachment to or suspension from any convenient portion of the turnstile or car, or other vehicle with which it is to be used.

A glazed aperture or window is provided at 13 through which the registering dials may be read as shown in Fig. 1. The external casing is made in any convenient form for opening and closing, so as to give access to the interior mechanism, which may be locked against unauthorized examination by means of a lock, the cylinder of which is shown at 14, in Figs. 1 and 2.

Provision is made for receiving the coins into the fare box through an observation tower or chamber 15. The cover 16 of this tower is provided with a number of apertures 17, which limit the sizes of coins to be received. This machine is herein assumed to be limited to pennies, dimes and nickels, and the registration is effected in terms of five cent fares. Hence the registering devices convert or translate all coins received into units of five cents each, registering one unit for five pennies, or for a five cent piece, and two units for a ten cent piece, or dime. Therefore in this case the apertures 17 in the top or cover are assumed to exclude all coins larger than a five cent piece or nickel.

The coins, after passing through the openings 17, fall upon a succession of inclined plates 18, generally of glass, which retard the falling movement of the coins and enable them to be examined on both sides. After sliding over these plates, the coins fall upon a trap door 19 (Figs. 4, 5 and 6) which closes the bottom of the inspecting tower or chamber, the door being held in its closed position shown in Fig. 5 by any suitable spring. A handle 20 upon the outer side enables the trap door to be tilted as shown in Fig. 6, whereupon the coins then lying upon the door, after being inspected, slide down into an interior coin receptacle or hopper, situated just below the trap door. As shown in Figs. 11 and 12, this receptacle comprises a movable member which, in the present instance, forms one wall of the hopper and consists of a circular coin carrying plate 22, provided with a hub 23, which is mounted for rotation upon a stud 24, supported by the framing 25. The hub 23 is provided with a gear 26 by means of which rotary movement is transmitted to the coin carrier from a gear 27 upon the driving shaft 28, which is journaled in the framing, with its end projecting through the exterior casing to receive the crank 29, which is turned by the operator's hand. Instead of being firmly fixed to the shaft, the crank is preferably secured thereto by a slip joint, illustrated in Fig. 27.

A clutch hub 32 is firmly secured to the driving shaft 28 by means of a cross pin 33 or otherwise, and carries a bolt 34, which is loosely fitted for sliding movement in the hub, with a spring 35 behind it. The end of the bolt is rounded or conical and projects into a similar shaped recess in the inner end of the hub of the crank 29, which is held endwise to place against the clutch hub by means of a nut 36, threaded or otherwise secured upon the end of the shaft or fixed thereto by means of a cross pin 37. The hub of the crank 29 is preferably turned down so as to fit loosely in a hole in the exterior casing 10, through which the inner end of the hub projects, against the clutch hub. Whenever the interior mechanism is blocked from any cause, the spring 35 enables the yielding clutch pin to be forced out of its seat in the crank hub 29, thus preventing serious injury being done to the interior mechanism, which might result if the crank were fixed upon the shaft.

The inner end of the shaft is journaled in the framing 25, and a bracket 38 extending from the framing is employed for supporting the outer end of the shaft when the casing 10 is removed. The inner end of the driving shaft 28 beyond its bearing has mounted upon it a ratchet 39 coöperating with a detent 40 pivotally mounted at 41 upon the frame; and held by the spring 42 into contact with the ratchet wheel to prevent backward turning movement of the driving shaft, but permitting forward turning movement thereof. Beyond this ratchet the shaft 29 has fixed upon its end a crank 45 which by means of the connecting rod 46 imparts reciprocating movement to the coin advancing and measuring carriage to be described later.

The coin carrier is herein shown in the form of a rotating circular disk which rotary movement is imparted to the coin carrier as shown in Figs. 8 and 11. The plane of its rotation is inclined as best shown in Figs. 7 and 8, so that the coins which fall upon it naturally gravitate to its lower side, the accumulation being prevented from overflowing by means of a turned up rim 47 of the carrier; and also by the truncated conical hopper 44 extending above the rim of the coin carrier, as shown in Figs. 11 and 12. The coins, after falling upon the carrier, are thus confined to the carrier, and find their exit therefrom only through a coin aperture 48 in the carrier, which is in effect a receiving seat for receiving only a single coin, the edges of the aperture being reduced slightly below the thickness of the thinnest coin to be handled, so that the coins received upon the carrier will be separated and carried up singly, any surplus coins being brushed or swept back by means of a rotating brush 49 on the brush shaft 50, which is journaled at its ends in the hopper. As a means for agitating the brush, one end of the shaft 50 projects through the side of the hopper and has fixed upon its outer end a gear 51, meshing with the upwardly projecting gear teeth 52, provided in the circular rim 47 of the coin carrier, so that the latter as it rotates imparts also a rotating motion to the coin brush 49 (Figs. 7, 9, 11 and 12.) Complete or continuous rotary movement of the brush, although preferable and more conveniently effected, is not essential, since almost any agitating movement of the brush in the required direction would suffice.

The rotating coin carrier rests upon the surface of a stationary platen 55, which forms a circular raceway extending beneath the circular path of the coin seat 48 of the coin carrier. This raceway is provided with a discharge or ejecting aperture 56, registering with the coin seat 48 at the discharging position of the latter, and leading to the coin measuring carriage; so that the separated coins, after falling into the coin seat 48 in the coin carrier are slid over the raceway until they reach the discharge opening therein, whereupon they fall through that discharge opening, as shown in Fig. 12, and through a fixed guiding chute 59 to the reciprocating carriage by which they are advanced to and through the measuring and selecting mechanism.

As a further safeguard to prevent more than one coin at a time from being discharged from the coin carrier, the guard 60, attached to the sides of the hopper 44, or to any other convenient stationary support, overlies the coin aperture 48 at its coin discharging position over the ejecting aperture 56 of the platen, as best shown in Figs. 9 and 12, preferably extending along the annular pathway of the revolving coin aperture as far as the brush 49, forming a covered passage through which the separated single coins are normally carried in the coin aperture of the carrier until they reach their discharging position over the aperture 56 of the platen. This guard thus prevents stray coins from falling or rolling into or upon the discharge aperture, or from being discharged from the carrier otherwise than by the normal way of the coin aperture 48 of the carrier. The inner edge 61 of the guard preferably fits closely against the surface of the carrier, so that not even the thinnest coins can enter from the inside between the guard plate and the surface of the carrier.

The upper surface of the guard plate partakes of the general inclination toward the lower side of the carrier, so that the coins which happen to fall or roll upon or against the plate are deflected downwardly toward the lowest portion of the carrier. To further deflect these coins and turn them down flatly upon the coin carrier, a shield 65 is provided, also preferably attached to the inner surface of the hopper. The face 66 of this shield, in addition to being inclined in an annular direction toward the bottom portion of the carrier, is also inclined to the axis of the carrier, as best shown in Fig. 11, to deflect the coins against the surface of the carrier, so that after rolling past the end of the shield they will fall flatly upon the surface of the carrier in a parallel relation to the coin receiving aperture, as shown by the heap of coins 67, in Figs. 10 and 11. In the absence of this shield, the coins are liable to stand on edge, leaning against the inner surface of the hopper 44, and thus roll around upon the plate for a considerable time, without advancing with the plate, or coming within reach of the coin aperture 48.

At the discharging position of the coin carrier, the coins fall singly through the apertures 48 and 56 of the coin carrier and the platen as illustrated in Fig. 12, passing thence through the guiding chute 59 to the surface of a receiving plate 71 of the carriage 70, which is mounted for sliding reciprocating movement in the frame, and is driven by means of the crank 45 and a connecting rod 46, as before described, the rod being connected to the stud 72 of the carriage (Figs. 7 and 15). The carriage being at the forward or left hand end of its stroke, when the coin 8 falls, the latter is received upon the rearward end of the receiving plate 71 (Figs. 13 and 15) and during the backward movement of the carriage the receiving plate is drawn back beneath the coin, the latter being held in stationary position by the lower edge of the chute 59, until the coin pocket 73 in the receiving plate is brought beneath the coin, which then falls into that pocket, as shown in Figs. 14 and 16, and rests upon the surface of the stop 74, which is attached to a fixed portion of the frame. Upon the next forward movement of the carriage, the coin is slid along upon the top of the stop by the lower edge 75 of the pocket until, arriving at the position shown in Fig. 17, the coin is pushed off the end of the stop 74 and lies in front of the end of the stop upon the surface 76 of the carriage, as shown in Figs. 17 and 19, this being the position in which the coin is then held stationary while subjected to the measuring operation, during which operation the edges of the coin are supported by the end of the stop 74 and the shoulder 84 (Fig. 21). Meanwhile the coin is prevented from rising by the guard or finger 89, which is preferably flexible and is carried by the plate 71 of the carriage.

The carriage is provided with a measuring or selecting lever 80, which is pivotally mounted at 77 upon the carriage, for horizontal swinging movement, and is pressed toward the edge of the coin by means of the spring 81. The measuring lever rests upon the surface 76 of the carriage, with its inner measuring edge 82 in the plane of the coin, so as to engage therewith when the carriage is drawn backwardly from the position shown in Fig. 19 to the measuring positions shown in Figs. 21, 22 and 23. A stop pin 83 on the carriage engages with the measuring lever as shown in Fig. 19, to stop it at its innermost resting position, the flanged head of the stop preferably projecting over the upper surface of the measuring lever to guide the lever in its horizontal swinging movement, and to resist the tendency of the end of the measuring lever to be lifted away from the carriage by its engagement with the registering ratchet mechanism.

As the carriage is drawn backwardly from the position shown in Fig. 19, the measuring edge 82 of the measuring lever 80 is moved against the edge of the coin, as shown in Figs. 21, 22 and 23, the coin lying upon the top of the carriage and being held stationary by means of the end of the stop 74 on one side, and by a shoulder 84 formed by the side of the framing. As the measuring lever is thus drawn along past the edge of the coin, the latter swings the lever more or less, according to the size of the coin, as illustrated by comparison of Figs. 21, 22 and 23, which illustrate the three relative positions of the lever, due to the three different sizes of coin herein illustrated, Fig. 21 illustrating the measurement of a ten cent piece or "dime," Fig. 22 the measurement of a one cent piece, and Fig. 23 the measurement of a five cent piece, or "nickel." According to the positions of the lever, thus determined by the size of the coin, its outer or left hand swinging end selects the appropriate coacting member of the registered device best shown in Figs. 16, 20 and 24. The free end of the measuring arm or lever has connected thereto and moving therewith an actuating device which coöperates with a plurality of other devices for causing the operation of the selected registering device, the registering device selected depending upon the position of the measuring arm and its actuating device. In the present instance the actuating device is in the form of a selecting shoulder or hook 85, which as best shown in Figs. 20 and 24, engages with one or the other of the register arms 86, 87, or 88, according to the size of the coin, which are so arranged and connected with the registering dials 90 as to impart thereto advancing movement corresponding to the denomination of the coin; or, in the present instance, the number of fares which the respective coins represent.

In order to release the coin from the measuring lever, after it has set or adjusted that lever to its position for selecting the appropriate registering device, a guiding device is provided for holding the lever in the selected position during the remainder of its backward movement, during which time the lever effects the advancement of the appropriate registering device. This guiding device consists in the present instance of a series of guiding ribs or shoulders 91, 92 and 93, which are disposed in suitable position for engaging the guide pin 94, appurtenant to the measuring lever, and thereby sustaining the measuring lever, against the pressure of its spring 81, in the selecting position to which it is moved, according to the size of the coin, as illustrated in Figs. 21, 22, and 23. These guides and their relation to the measuring lever and the registering devices are best shown in Figs. 21—24. The ends of the guiding ribs are slightly beveled or flared at their entering ends to allow of variations in the position of the guide pin 94, when approaching the guides, due to variations in the size of the coins, caused by their wear or deformation.

As it may sometimes happen that undersized or badly worn coins or counterfeit slugs will be put through the machine, which may sometime cause the guide pin 94 to catch against the extreme end of the guides, the measuring lever is preferably loosely mounted upon its pivot, as shown in Fig. 19, the end of the slot 78 in the lever being yieldingly held to its proper pivotal position against the pin as shown in Fig. 19, by means of a spring 79, which enables that end of the lever to be pushed slightly aside by the coin, in case the guide pin 94 should become locked against the end of either of its guides. This yielding action of the pivotal end of the lever, coupled with the continued pushing action of the coin against the lever, imparts a compound rocking movement to the lever, changing the position of its pivotal action, and freeing the guide pin from the end of the guide, so that the pin will enter between the guides, and thus avoid blocking the machine against further action.

As the backward movement of the carriage continues from the position shown in Figs. 21, 22 and 23, the lever passes out of engagement with the coin, and at the same time the discharge opening 95 in the surface of the carriage is brought beneath the coin, so that the latter falls through that opening, as illustrated in Figs. 18 and 20, passing through a chute 96 into any suitable coin receiving drawer, which if desired may be accessible to the conductor, enabling him to use the coins for making change, after they have thus been registered in the machine.

The registering devices, which are operated by the measuring lever 80 are mounted upon the shaft 100, which is journaled in and extends through the frame 25 as shown in Figs. 7 and 24, and at its opposite end is provided with suitable connections for advancing the registering train of dials 90, which in this embodiment are shown to be mounted side by side upon the shaft, having peripheral figures which may be read through the glazed opening 13 in the cover or casing, as shown in Fig. 1. These dials 90 may be of any well known construction and arrangement for indicating dollars and cents, or, as herein shown, for indicating the number of inward fares paid. They may be provided with printing type from which impressed records of the dial readings may be taken. In this instance the shaft 100, driven by the registering devices, has upon its opposite end a pinion 102, meshing with an intermediate gear 103, which in turn is geared with the units member of the registering train of dials 90.

The selective registering devices are best shown in end view in Fig. 24. The ratchet wheel 106 for the five-cent pieces or "nickels" and the ratchet wheel 104 for the dimes or ten-cent pieces, are pinned or otherwise secured to the shaft 100, while the ratchet wheel 105 for pennies turns loosely upon the shaft 100 between the other two ratchet wheels. The nickel ratchet 106 is advanced by means of a pawl 109, pivoted to the selecting register arm 88, which is mounted for rocking movement on the shaft 100, being yieldingly drawn back by means of a spring 114, which returns the end of the arm against the cross bar 115 of the framing, or against any other suitable stop. The upper end of this selecting arm lies in the pathway of the selecting hook or shoulder of the measuring lever 80, when the latter is positioned by a five-cent piece, as shown in Fig. 23, so as to actuate the pawl 109, and through it the ratchet wheel 106, whenever a five-cent piece is measured. The amplitude of swinging movement of the selecting arm 88 is arranged so as to advance the registering dials 90 one step, thus registering a five-cent fare. The ten-cent or "dime" ratchet wheel 104 is advanced by means of a pawl 107, pivoted to the side of its selecting arm 86, which is similarly mounted for swinging movement upon or concentric with the shaft 100, its lower end being held back against the cross bar 115 as a stop, by means of a spring 112. The upper end of this arm is disposed in the pathway traversed by the selecting hook or shoulder 85 of the measuring lever, when the latter is positioned by a dime, as shown in Fig. 21, the amplitude of movement of the pawl lever being arranged to advance its ratchet wheel and consequently the registering dials two units, or twice as far as those dials are advanced by the registration of a nickel, previously described.

The registration of separate pennies is effected by means of the ratchet wheel 105, in conjunction with the nickel ratchet wheel 106, the arrangement and interrelation of which is best shown in Figs. 32 and 33, the penny ratchet wheel turning loosely upon the shaft 100 while the nickel ratchet is fixed to that shaft.

The penny ratchet 105 is advanced by means of a pawl 108 which is pivoted at 110 to the selecting arm 87, the latter being mounted for swinging movement upon or concentric with the shaft 100, with its upper end projecting into the pathway traversed by the selecting hook or shoulder 85 of the measuring lever, when the latter is positioned by a penny, as shown in Figs. 22 and 24. The end of the pawl 108 extends across the plane of the teeth of both of the ratchets 105 and 106, being held into engagement therewith by a spring 111. The penny ratchet 105 is larger in diameter than the nickel ratchet 106; and the number of its teeth is a multiple of five, four of these teeth, due to their greater radial distance from the center, holding the end of the pawl 108 outside of the circle of the nickel ratchet 106, as shown in Fig. 32. But the spaces 118 behind the fifth tooth in each succession, are notched deeply enough to allow the pawl 108 to come into engagement with the nickel ratchet 106 at every fifth actuation, as shown in Fig. 33, thereby advancing the nickel ratchet one step, and thus registering a five-cent fare upon the registering dials for every fifth penny passing through the machine. It will be understood that the different coins may pass through in any succession, as they are received, for example registering first a nickel, then two pennies, then a dime, then another nickel, then more pennies, and so on.

The penny ratchet 105 is provided with the customary detent pawl or click 119, pivoted at 120 to the framing, to prevent that ratchet from turning backwardly, as its pawl 108 draws backwardly over the teeth; but no such detents or clicks are necessary for the ratchets 105 and 106, since they are both fastened to the same shaft 100 and the pawls 107 and 109 serve as clicks or detents for each other.

The selecting arm 87 for pennies is herein shown to be provided with a spring 121, attached to the framing at 122, for returning the arm to resting position after being operated by the selector 85.

This invention may be modified in various ways to suit it to different conditions. Some of these modifications are shown in Figs. 34 to 40 inclusive. Therein the coin carrier 126 is shown to be provided with a plurality of coin receiving apertures 127 for carrying up the coins, the coin carrier and the carriage 130 being so rotated together that the carriage makes one complete forward and backward movement for each of the coin apertures in the carrier. The driving shaft 131 having upon one end the operating crank 132, is provided with a driving pinion 133, meshing with a peripheral circle of gear teeth 134, in the outer edge of the coin, while the crank 135 for driving the carriage 130 is connected with the driving shaft by means of gears 136 and 137. The general construction and mode of operation of the carriage, the measuring pawl, the selecting devices and the registering train, are or may be similar to the arrangement previously described herein, and shown in the preceding figures. In this modification, the coin carrier is provided with a plurality of rotary brushes 140 and 141 on the shafts 142 and 143, respectively, driven by pinions 144 and 145, gearing with and driven by an annular row of teeth 146, cut in the upturned edge of the coin carrier 126. The brush 141, like the brush 49 in the previous figures, is disposed in advance of the discharging position of the coins, and performs functions similar to those of the brush 49, wiping or sweeping back the superfluous coins from the top of the single coin normally carried by each of the coin apertures of the carrier. The brush 140 is disposed over the discharge apertures 127 and 162 of the coin carrier and platen, respectively, (Fig. 34), to assist in discharging the coins more positively through these apertures, and also to discharge the coin flatly down upon the carriage plate 168, preventing it from becoming tilted or displaced while passing through the discharge apertures.

Suitable guards and shields, which may be similar to those previously described, are provided in connection with the coin carrier, or in its associated hopper, to guide and deflect the coins toward the lower portion of the inclined coin plate, at which portion it is desired to have the coin plate receive the coins separately.

The coins are discharged from the carrier to the surface of the carriage plate 168 while the carriage is near its forward position (Figs. 36, 38). As the carriage then moves back, the plate 168 slides under the coin, pushing it against the shoulder 190 of the platen, which thus sweeps the coin into the coin pocket 169 of the carriage (Fig. 37). Pivotally mounted upon the carriage at 151, and held down by a spring 149 is a movable deflecting finger or gripper 150, which as the coin falls into the pocket 169 slides over the coin to retain it in the pocket, as shown in Fig. 37. From this position, by the next forward movement of the carriage, the coin, still lying under the finger 150, is pushed along by the edge 191 of the pocket 169 past the end of the stop 152, in front of which the coin falls (Fig. 38), assisted by the finger 150, which operates to prevent the coin from being displaced from its proper course or position, as for example, by the jolting of the vehicle. The movements of this finger or gripper 150 are controlled by various instrumentalities along its pathway. It is provided with an arm 153, which as the end of the deflecting finger passes over the edge of the coin (Fig. 37), passes beneath a cam like portion 155 of the stationary platen 154, which closes the finger down toward the coin, confining it to the pocket in which the coin then lies, to prevent material displacement of the coin during its forward movement with the carriage. As the coin, moved by the edge 191, slides off the forward end of the stop 152, the projection 156 of the finger passes beneath the beveled end of the dog 157 (Fig. 38) which is pivotally attached at 158 to the framing, and serves to move the finger down to carry the coin positively to its seat upon the carriage in front of the stop 152, as shown in Fig. 38. As the carriage moves back from this position, bringing the selecting measuring lever 160 against the edge of the coin, the latter is held against upward displacement by means of the plate 168 of the carriage, the lower surface of which then passes over the surface of the coin. The dog 157 is provided with a spring 159, to enable it and the finger 150 to adapt themselves to the different thicknesses of coins to be handled, and to allow bent or battered coins to pass through without blocking the mechanism.

In order to prevent the coin from sliding forward prematurely, after falling from the platen upon the carriage plate 68, as shown in Fig. 38, a stud or lug 166 projects downwardly from the platen in front of the coin, the deflecting finger 150 being cut away or forked at 167 (Fig. 39) to enable it to clear the stud 166 when that finger is at the rearward end of its stroke.

In order to prevent too rapid reciprocation of the carriage, and thus insure suitable time for the performance of each of its functions, a speed checking device is provided, consisting of a dog 170, which is pivoted at 171 in the framing, and extends beneath the carriage, which is provided with stop shoulders 172 and 173 for coacting with the stop bolt. A spring 174, yieldingly holds the dog in its lower position, clear of the stop shoulders of the carriage, and the dog is moved upwardly between the shoulders, as illustrated in Figs. 25 and 26, at each forward and backward movement of the carriage, by means of a stud or cam 175 appurtenant to the carriage. The opposite inclined faces of the cam engage with an arm 176 of the dog, and swings the latter up into the space between the stop shoulders 172 and 173, against the pressure of the spring 174, passing by and releasing the dog immediately, so that the latter is moved by its spring out of the pathway of the approaching stop shoulder of the carriage before the latter reaches it, in case the mechanism is being operated at a suitably moderate speed. If, however, the carriage is operated at an excessive speed, the bolt has insufficient time to fall out of the way, in which case one of the stop shoulders 172 or 173 collides with the bolt, and arrests the movement momentarily, thus indicating to the operator that he is running the machine faster than the proper speed.

A buffer spring 177 appurtenant to the dog 170 (Figs. 25, 26) is preferably employed, which strikes against the side of the frame 25 to cushion the force of the downward movement of the dog, at the end of its stroke.

In case it is desired to permit the conductor or attendant to have access to the coin drawer 180 for the purpose of making change, means are provided for locking the drawer and for releasing it automatically at a certain period in the registering operation, as may be advisable to prevent tampering with the interior mechanism, or at a time when no coin is falling into the drawer. This arrangement is best shown in Figs. 28 to 31 inclusive. The drawer is provided with a locking lug 181, and a locking dog 182 pivotally mounted at 183 upon the framing 25 is yieldingly held by a spring 184 (Figs. 7 and 8) so as to carry the locking arm of the dog 182 in front of the lug 181, as shown in Figs. 28 and 29, thus preventing the opening of the drawer. An arm 185 of the locking dog is disposed in the pathway of revolution of the crank 45, or the end of the connecting rod 46, so that during a portion of that revolution, as shown at Figs. 30 and 31, the crank or the rod depresses the bolt, and releases the drawer. Therefore, in this case, when it is desired to open the drawer, the machine is stopped with the crank in the position of Fig. 30. The lower end of the locking lug 181 of the drawer is preferably rounded, and the outer side of the coengaging portion of the locking bolt is inclined at 186, so that the drawer may be pushed in past the bolt, at any part of the revolution of the crank 45.

This invention may be modified or amplified in various ways to adapt it to different uses or conditions.

I claim:—

1. The combination, with a rotary coin carrier comprising a disk, having a coin receiving seat on one face thereof and provided with an annular rack, a brush rotatably mounted adjacent to the path of travel of the coin seat for brushing away the coins from said seat and having a shaft, and a gear connected with said shaft and meshing with said annular rack.

2. The combination, with a rotary coin carrier comprising a disk having an annular rack at its edge, having its plane of rotation inclined from the horizontal and having a coin receiving seat, a rotating brush adjacent to an elevated portion of the inclined path of travel of said coin seat for brushing the coins away from said seat to a lower portion of the coin carrier, said brush having a shaft and a gear connected with said shaft and meshing with said annular rack.

3. The combination, with a hopper comprising a rotary coin carrier to separate the coins and discharge them singly from the carrier, an inwardly extending structure carried by said hopper and having a portion forming a guard plate overlying the discharge position of the apertures, and means coöperating with said guard plate to turn the coins flatly upon the carrier.

4. The combination, with a hopper comprising a rotary coin carrier to separate the coins and discharge them singly from the carrier, an inwardly extending structure carried by said hopper and having a portion forming a guard plate overlying the discharge position of the apertures, and having another portion forming a shield for deflecting and turning the coins flatly upon the carrier.

5. The combination, with coin handling devices, of means for separating the coins and advancing them singly, selective registering mechanism for the different coin denominations having a register actuating device for each denomination, and a pivoted selector movable different distances by the coins according to their size to cause the operation of the appropriate register actuating device.

6. The combination, with coin handling devices, of means for separating the coins and advancing them singly, selective registering mechanism for the different coin denominations having a register actuating device for each denomination, a measuring lever movable different distances by the coins according to their size, and a part carried by said lever and arranged to be moved into operative relation to the appropriate register actuating device by the movement of said arm.

7. In a coin registering mechanism, the combination, with coin handling devices and means for separating the coins and advancing them singly, of a register, and differential operating mechanism for said register comprising a measuring arm movable into different positions by the coins, an actuating device movable with said arm, and a plurality of other devices arranged to coöperate respectively with said actuating device to cause said register to be actuated in accordance with the value of each coin.

8. In a coin registering mechanism, the combination, with coin handling devices and means for separating the coins and advancing them singly, of a register, and differential operating mechanism for said register comprising a measuring arm arranged to be engaged by the edges of the coins and to be moved into different positions by said coins according to the denominations of the coins, an actuating device movable with said arm, and a plurality of other devices arranged to coöperate respectively with said actuating device to cause said register to be actuated in accordance with the value of each coin.

9. In a coin registering mechanism, the combination, with coin handling devices and means for separating the coins and advancing them singly, of a register, and differential operating mechanism for said register comprising a measuring arm pivotally mounted at one end and having its intermediate portion arranged to be engaged by the coins, whereby said lever will be moved into different positions according to the diameters of the coins, an actuating device connected with that end of said arm opposite its axis and moving therewith, and a plurality of other devices arranged to coöperate respectively with said actuating device to cause said register to be actuated in accordance with the value of each coin.

10. In a coin registering mechanism, the combination, with coin handling devices and means for separating the coins and advancing them singly, of a register, and differential operating mechanism for said register comprising a measuring arm pivotally mounted at one end and having its intermediate portion arranged to be engaged by the coins, whereby said arm will be moved into different positions according to the diameters of the coins, a toothed actuating device connected with that end of said arm opposite its axis and movable therewith, and a plurality of toothed devices arranged to coöperate, respectively, with said toothed actuating device to cause said register to be actuated in accordance with the value of each coin.

11. In a coin registering mechanism, the combination, with coin handling devices and means for separating the coins and advancing singly, of a register, and differential operating mechanism for said register comprising a measuring arm pivotally mounted at one end and having an intermediate portion arranged to be engaged by the edges of the coins, a fixed support to engage each coin opposite its point of contact with said measuring arm, an actuating device movable with either end of said measuring arm, and a plurality of other devices arranged to coöperate, respectively, with said actuating device to cause said register to be actuated in accordance with the value of each coin.

12. In a coin registering mechanism, the combination, with coin handling devices and means for separating the coins and advancing them singly, of a register, and differential operating mechanism for said register comprising a measuring arm pivotally supported at one end and arranged to be engaged by the coins and moved into different positions according to the denomination of said coins, an actuating device arranged at the free end of said arm and movable into adjusted positions by the movement thereof, a plurality of other devices arranged to coöperate, respectively, with said actuating device to cause said register to be actuated in accordance with the value of each coin, and means to retain said actuating device in its adjusted position during the registering operation.

13. In a coin registering mechanism, the combination, with coin handling devices and means for separating the coins and advancing them singly, of a register, and differential operating mechanism for said register comprising a measuring arm pivotally mounted at one end and having at its other end a part forming an actuating device, said arm being arranged to be engaged by the coins and to be moved into different positions by coins of different denominations, and a plurality of other devices connected with said register and arranged to coöperate, respectively, with said actuating device to cause said register to be operated in accordance with the value of each coin.

14. In a coin registering mechanism, the combination, with coin handling devices and means for separating the coins and advancing them singly, of a register, and a differential operating mechanism for said register comprising a pivoted measuring arm having an actuating device at its free end, a fixed coin support, and means to move said arm past said coin support and cause it to engage the edge of a coin supported thereon, whereby said actuating device will be moved into different positions, and a plurality of devices connected with said register and arranged to coöperate, respectively, with said actuating device to cause said register to be actuated in accordance with the value of each coin.

15. In a coin registering mechanism, the combination, with coin handling devices and means for separating the coins and advancing them singly, of a register, and a differential operating mechanism for said register comprising a pivoted measuring arm having an actuating device at its free end, a fixed coin support, means to move said arm past said coin support and cause it to engage the edge of a coin supported thereon, whereby said actuating device will be moved into different positions, a plurality of devices connected with said register and arranged to coöperate, respectively, with said actuating device to cause said register to be actuated in accordance with the value of each coin, and means to retain said actuating device in its adjusted position during the registering operation.

16. The combination, in coin handling devices, of means for separating the coins and advancing them singly, selective registering mechanism for the different coin denominations having a selecting arm for each denomination, and a selector movable by the coins according to their size into engaging relation to the appropriate selecting arm.

17. In coin handling devices, the combination of means for separating the coins, a reciprocating carriage for receiving the separated coins, selective registering mechanism for the different coin denominations, and a selector, moved by the carriage into engagement with the coins and controlled by their size, for selecting the appropriate registering mechanism.

18. In coin handling devices, the combination of means for separating the coins, a reciprocating carriage for receiving and advancing the separated coins, selective registering mechanism for the different coin denominations, and a selector mounted on the carriage and moved by its reciprocations into engagement with the coins and controlled by their varying sizes, for selecting and operating the appropriate registering mechanism.

19. In coin handling devices, the combination of means for separating coins, a reciprocating carriage for receiving and advancing the separated coins, selective registering mechanism for the different coin denominations, and a measuring selector pivotally mounted on the carriage and movable against the coins by the reciprocating movements of the carriage whereby the selector is adjusted on its pivot into selecting relation to the appropriate registering mechanism.

20. In coin handling devices, the combination of means for separating the coins, a reciprocating carriage for receiving the separated coins, registering mechanism for the different coin denominations, and a measuring selector mounted for reciprocation with the carriage and for lateral swinging movement on the carriage against the succeeding coins, whereby the selector is laterally moved by each coin into appropriate selecting relation to the appropriate registering mechanism for that coin.

21. In coin handling devices, the combination of registering mechanism for the different coin denominations, a selector mounted for reciprocating movement relative to the registering mechanism, and for swinging movement relative to the coins, and means for moving the selector against each succeeding coin to position the register for engagement with the appropriate registering mechanism.

22. In coin handling devices, the combination of means for separating the coins, selective registering mechanism for the different coin denominations, a selector mounted for lateral movement to select the appropriate registering mechanism, and for reciprocating movement to operate the mechanism selected and means for effecting coengagement between each coin and the selector for moving the selector to its appropriate selecting relation to the registering mechanism.

23. The combination, in coin handling devices, of selective registering mechanism for the different coin denominations, a reciprocating selector movable by the coins laterally in its path of reciprocation, to position it for selecting engagement with the appropriate registering mechanism, and guides for holding the selector in the respective positions without interfering with its reciprocatory movement.

24. The combination, in coin handling devices, of selective registering mechanism including separate operating arms for the respective coin denominations, a reciprocating selector movable laterally by coins in its path of reciprocation to position the selector in operative relation to the appropirate arms.

25. The combination, in coin handling devices, of selective registering mechanism, including separate operating arms for the respective coin denominations, a reciprocating selector, movable by the coins laterally in its path of reciprocation to position the selector in engaging relation to the appropriate arms, and guides for maintaining the selector in engaging positions.

26. The combination, in coin handling devices, of selective registering mechanism for the different coin denominations, and a pivotally supported selector movable by the coins into engaging relation to the appropriate registering mechanism, and having a yielding connection with is pivotal support.

27. The combination, in coin handling devices, of selective registering mechanism for the different coin denominations, a pivotally mounted selector movable by the coins into engaging relation to the appropriate registering mechanism, and guides for retaining the selector in the said engaging relation, the selector having a yielding spring controlled connection with its pivot.

28. The combination, in coin handling devices, of selecting registering mechanism for different coin denominations, a reciprocating carriage, a selector pivotally mounted on the carriage for swinging movement lateral to its path of reciprocation, means for moving the selector to different lateral positions under control of the coins, and guides for retaining the selector in said lateral positions during its reciprocation.

29. The combination, in coin handling devices, of selective registering mechanism for the different coin denominations, a reciprocating carriage, a selector pivotally mounted on the carriage for operating the said registering mechanism, and movable laterally for selective engagement with the different mechanisms, means for moving the selector laterally to its different selecting positions under the control of the different coins, and guides for retaining the selector in the selected positions during the carriage reciprocations.

30. The combination, in coin handling devices, of registering mechanism for the different coin denominations, a reciprocating carriage having a coin pocket for advancing the coins in one direction, a stop for preventing the return of the coins, and a selector mounted upon the carriage and moved into engagement with the coins during the return movement of the carriage for positioning the selector relative to the appropriate registering mechanism.

31. The combination, with coin handling devices, of means for separating the coins and advancing them singly, including a rotary coin carrier, and a reciprocating carriage for receiving the coins singly from the carrier, provided with a coin pocket for advancing the successive coins with the carriage, a stop for preventing the return of the coins with the return reciprocations of the carriage, and means for holding the coin against displacement from the pocket and from the stop.

32. The combination, with coin handling devices, of means for separating the coins and advancing them singly, including a rotary coin carrier, and a reciprocating carriage for receiving the coins singly from the carrier, provided with a coin pocket for advancing the single coins in succession with the carriage, and a yielding finger appurtenant to the carriage and overlying the coin, to prevent its displacement.

33. The combination, in coin registering mechanism, of registering ratchets for different coin denominations, operating arms for the respective ratchets, a selector for operating the said arms, and movable under the control of the different coins into operating relation to the respective arms.

34. The combination, in coin registering mechanism, of registering ratchets for the different coin denominations, operating arms for the respective ratchets, means including a selector for selecting and operating the said arms under the control of the coins, and means for advancing a ratchet of one denomination when a ratchet for a lower denomination has registered coins of the lower denomination equaling in value the first named denomination.

35. The combination, with a registering apparatus, of a reciprocating member provided with a stop shoulder, a dog movable into and out of the path of said stop shoulder, a spring tending to move said dog out of said path, and means to move said dog into the path of said shoulder upon each reciprocation of said member and to then release the same.

In testimony whereof I have signed my name to this specification in the presence of two subscribing witnesses this 3rd day of February, 1912.

SAMUEL P. HUNTINGTON.

Witnesses:
ANDREW J. HATCH,
FRANK B. KENNEDY.

Copies of this patent may be obtained for five cents each, by addressing the "Commissioner of Patents, Washington, D. C."